United States Patent Office 3,413,313
Patented Nov. 26, 1968

3,413,313
ANTHRANILIC ACID COMPOUNDS AND
METHODS FOR THEIR PRODUCTION
Robert A. Scherrer, Ann Arbor, Mich., assignor to Parke,
Davis & Company, Detroit, Mich., a corporation of
Michigan
No Drawing. Filed June 18, 1964, Ser. No. 376,208
6 Claims. (Cl. 260—340.9)

ABSTRACT OF THE DISCLOSURE

N-arylanthranilic acids and salts and esters thereof, in which the N-aryl group is phenyl, substituted in the 2-position by methyl or chlorine, optionally substituted in the 6-position by methyl or chlorine, and substituted in the 3-position by hydroxyalkyl, substituted carbonyl, ketoxime, cyclic ketal, tertiary amido, or cyano, useful as anti-inflammatory, anti-pyretic and anti-allergic agents; and their production by (a) reacting a o-halo- or o-aminobenzoic acid derivative with a suitably substituted aniline or halobenzene compound, (b) reacting one of the carbonyl compounds with hydroxylamine to produce one of the ketoxime compounds, (c) reacting one of the ketoxime or cyclic ketal compounds with aqueous acid to produce one of the carbonyl compounds, (d) reducing one of the carbonyl compounds to produce one of the hydroxyalkyl compounds, and (e) esterifying the free acids to produce a lower alkyl or di-lower alkyl-aminoalkyl ester.

---

Summary and detailed description

The present invention relates to new anthranilic acid compounds and to methods for their production. More particularly, the invention relates to new N-arylanthranilic acid compounds, which in their free acid form have the formula,

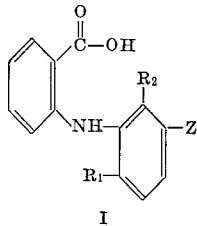

I to carboxylate salts thereof, to lower alkyl esters thereof, to di-lower alkyl-aminoalkyl esters thereof, and to pharmaceutically-acceptable acid-addition salts and quaternary salts of the di-lower alkyl-aminoalkyl esters thereof; where $R_1$ is hydrogen, methyl, or chlorine; $R_2$ is methyl or chlorine; and Z is a hydroxyalkyl group, having the formula

a substituted carbonyl group, having the formula,

a ketoxime group, having the formula,

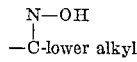

a cyclic ketal group, having the formula,

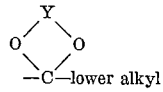

a tertiary amide group, having the formula,

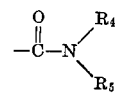

or a cyano group: wherein $R_3$ is lower alkyl, phenyl, or lower alkyl-substituted phenyl; $R_4$ is methyl or ethyl; $R_5$ is methyl or ethyl; and Y is straight-chain or branched-chain lower alkylene radical separating the oxygen atoms to which it is attached by at least 2 carbon atoms. In general, the preferred compounds of the invention are the free acids having Formula I. The lower alkyl groups appearing in the foregoing formulas are selected from among alkyl groups containing not more than 4 carbon atoms.

In accordance with the invention, N-arylanthranilic acids having Formula I, carboxylate salts thereof and lower alkyl esters thereof are produced by reacting a benzoic acid derivative having the formula

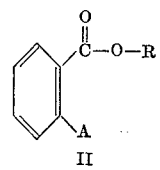

II with a compound of the formula

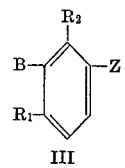

III where $R_1$, $R_2$, and Z have the same significance as given above; R represents hydrogen, lower alkyl, or a salt-forming cation, preferably an alkali metal cation, and one of A and B is halogen, preferably bromine, and the other is amino. Best results are obtained when A is halogen and B is amino. The reaction is preferably carried out in the presence of a copper-containing catalyst, such as cupric bromide or cupric acetate, and a proton acceptor. In carrying out the reaction, it is generally satisfactory to employ substantially equivalent quantities of the reactants in the presence of a suitable solvent. Some examples of such solvents are N,N-dimethylformamide, N,N-dimethylacetamide, diethylene glycol dimethylether, dimethyl sulfoxide, nitrobenzene, higher boiling hydrocarbons, and lower aliphatic alcohols, such as isopropyl alcohol, n-butyl alcohol, amyl alcohol, isoamyl alcohol, and the like. Preferred solvents are isopropyl alcohol, N,N-dimethylformamide, N,N-dimethylacetamide, and diethylene glycol dimethylether. The temperature and duration of the reaction may be varied over a wide range; a temperature in the range of 75–250° C. and a period of from 4 to 72 hours are satisfactorily employed.

The quantity of the proton acceptor employed in the reaction can be varied within wide limits. In general, sufficient should be used to bind the benzoic acid reactant and the hydrohalic acid formed in the course of the reaction. Some of the proton acceptors which can be used when the benzoic acid derivative is employed in free acid form are alkali metal carbonates, preferably potassium carbonate; cupric carbonate; cuprous carbonate and the like. When an alkali metal salt, preferably the potassium salt, of the benzoic acid reactant is employed, the following substances can be used as the proton acceptor: calcium hydride, alkali metal carbonates such as e.g. potassium carbonate and tertiary organic amines such as N-ethylmorpholine. If desired, two or more equivalents of the amine reactant can be used in which case one equivalent takes part in the condensation and the remainder acts as the proton acceptor.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

The compounds of Formula III, where B is amino, used as starting materials in the foregoing process, can be prepared in a number of ways. Those compounds of Formula III where Z is a substituted carbonyl group as defined above, in which $R_3$ is lower alkyl, can generally be prepared by reaction of an appropriate 2,6-disubstituted-acetanilide compound with a lower alkanoyl halide, such as acetyl chloride, in the presence of aluminum chloride, followed by basic hydrolysis of the 2,6-disubstituted-3-alkanoylacetanilide. The compounds of Formula III where Z is a substituted carbonyl group in which $R_3$ is phenyl or lower alkyl-substituted phenyl can be prepared by reacting an appropriate 2,4 - disubstituted - 3 - nitrobenzoic acid compound with thionyl chloride to produce a 2,4 - disubstituted - 3 - nitrobenzoyl chloride compound; reacting this intermediate acid halide with benzene or lower alkyl-substituted benzene in the presence of aluminum chloride to produce a 2,4 - disubstituted - 3 - nitrobenzophenone compound; and finally reacting the benzophenone compound with a reducing agent to produce the desired 3 - amino - 2,4 - disubstituted benzophenone. The compounds of Formula III where Z is a hydroxyalkyl group can be prepared by reduction of the compounds of Formula III where Z is a substituted carbonyl group. The compounds of Formula III where Z is a ketoxime group can be prepared by reaction of the compounds of Formula III where Z is a substituted carbonyl group with hydroxylamine or hydroxylamine hydrochloride. The compounds of Formula III where Z is a cyclic ketal group can be prepared by reaction of the compounds of Formula III where Z is a substituted carbonyl group with a glycol compound in the presence of an acid catalyst. Those compounds of Formula III where Z is a tertiary amide group can be prepared by reacting an appropriate 2,4-disubstituted - 3 - nitrobenzoyl chloride compound with dimethylamine or diethylamine followed by reduction of the nitro group of the intermediate 2,4 - disubstituted - 3 - nitrobenzamide compound. Those compounds of Formula III where Z is a cyano group can be prepared by reacting an appropriate 2,4 - disubstituted - 3 - nitrobenzonitrile compound with a reducing agent to produce the desired 3 - amino - 2,4 - disubstituted-benzonitrile. The required 2,4 - disubstituted - 3 - nitrobenzonitrile can be prepared either by reaction of a 2,4 - disubstituted - 3 - nitrobenzamide compound with phosphorus oxychloride in pyridine or by diazotization of a 2,4 - disubstituted - 3 - nitroaniline, followed by reaction of the diazonium salt obtained with cuprous cyanide.

The compounds of Formula III, where B is halogen, also used as starting materials in the foregoing process, can, in general, be prepared by the diazotization, in hydrobromic or hydrochloric acid, of the compounds of Formula III, where B is amino, followed by decomposition of the diazonium salt obtained in the presence of a copper catalyst.

Also in accordance with the invention N-aryl-anthranilic acid compounds having the formula

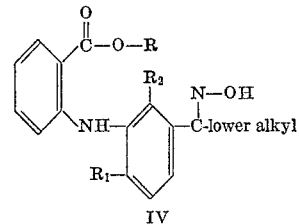

IV are produced by the reaction of an N-arylanthranilic acid compound having the formula

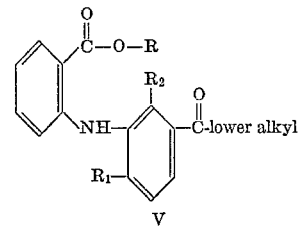

V with hydroxylamine; where R, $R_1$, and $R_2$ have the aforementioned significance. Hydroxylamine is preferably supplied to the reaction as a mineral acid salt, such as the hydrochloride or sulfate. When a mineral acid salt of hydroxylamine is used, the reaction is carried out in the presence of a base; suitable bases for this purpose are alkali metal hydroxides and tertiary amines, such as pyridine. Other reactants that may be used to effect oxime formation are sodium hydroxylamine disulfonate, which may be used directly or may be formed in situ by the reaction of sodium nitrite with sodium bisulfite, and hydroxylamine-O-sulfonic acid. These latter reagents may be used with or without added base. The process is normally carried out in a polar solvent. Suitable solvents are water, lower alkanols, tertiary amines, and mixtures of these. Preferred solvents are aqueous ethanol and a mixture of ethanol and pyridine. Best results are obtained when the hydroxylamine reactant is employed in excess, although equivalent quantities of reactants may also be used. The reaction may be carried out over a wide range of time and temperature. It is most convenient to carry out the reaction at the reflux temperature of the reaction mixture for a period of from one to 48 hours.

Further in accordance with the invention, N-arylanthranilic acids having the formula

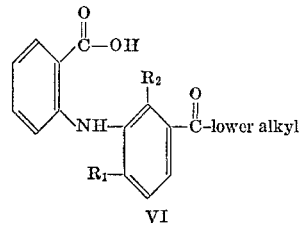

VI are produced by the reaction of an N-arylanthranilic acid compound having the formula

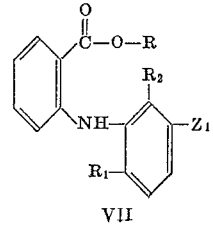

VII with an aqueous acid; where R, R₁, and R₂ have the aforementioned significance, and Z₁ is a ketoxime group, having the formula,

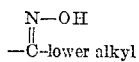

or a cyclic ketal group, having the formula

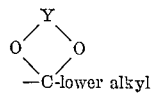

wherein Y is as defined previously. Preferred acids for carrying out the reaction are the mineral acids, such as sulfuric acid, hydrochloric acid, and phosphoric acid. Strong organic acids, such as benzenesulfonic acid and p-toluenesulfonic acid may also be used. Catalytic amounts of the acid employed are normally sufficient. The reaction is usually carried out in a water-miscible, inert solvent. Suitable solvents are lower alkanols, acetone, lower aliphatic glycols, cyclic ethers, such as dioxane and tetrahydrofuran, acetic acid, and mixtures of these. Water is normally employed in excess of the amount necessary to effect complete hydrolysis, although an equivalent quantity may also be used. The temperature and duration of the reaction may be varied over a wide range. It is most convenient to carry out the reaction at the reflux temperature of the reaction mixture for a period that may vary from a few minutes to 48 hours.

Also in accordance with the invention N-arylanthranilic acid compounds having the formula

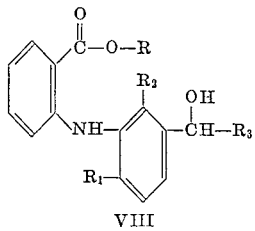

VIII are produced by the reduction of an N-arylanthranilic acid compound having the formula

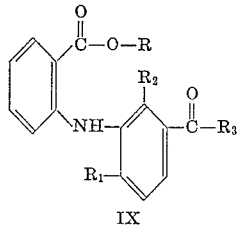

IX where R, R₁, R₂, and R₃ are as defined previously. The reduction may be accomplished by employing chemical, catalytic, or electrolytic means. Chemical reducing agents that may be used include lithium aluminum hydride; alkali metal borohydrides, such as sodium borohydride; sodium and ethanol; sodium amalgam; zinc and sodium hydroxide; magnesium and methanol; iron and acetic acid; aluminum amalgam and ethanol; and aluminum isopropoxide and isopropanol. The reduction is accomplished catalytically by employing gaseous hydrogen and any of the following catalysts: Raney nickel, copper-chromium oxide, copper-alumina, or a noble metal catalyst, such as platinum or palladium. Catalytic reduction employing Raney nickel and hydrogen at room temperature and 1–10 atmospheres pressure in an inert solvent is a preferred method. Preferred chemical reducing agents, which may be used in all cases, are sodium borohydride and zinc and sodium hydroxide.

When the reduction is accomplished catalytically by means of hydrogen and Raney nickel, suitable solvents that may be used include water, for reduction of compounds of formula IX where R is a salt-forming cation; lower alkanols, preferably ethanol; ethers, such as tetrahydrofuran and dioxane; N,N-dimethylformamide; and mixtures of these. The compounds of Formula IX where R is a salt-forming cation are preferred starting materials for this catalytic reduction. The reaction is allowed to proceed until the amount of hydrogen required for complete reduction has been taken up.

Suitable solvents for use with sodium borohydride are water, lower alkanols and mixtures of these. The reduction may be preferably carried out in aqueous solution at 0–100° C. for 1–4 hours, employing a carboxylate salt as starting material and an excess of sodium borohydride. When zinc and sodium hydroxide are used for the reduction, solvents that may be used include lower alkanols, lower aliphatic glycols, and mixtures of these. Ethanol is the preferred solvent. The reduction is best accomplished at the reflux temperature of the reaction mixture for a period of 4–6 hours. The temperature and duration of the reaction are not critical, however, and may be varied over a wide range.

The lower alkyl N-arylanthranilate compounds of the invention having the formula

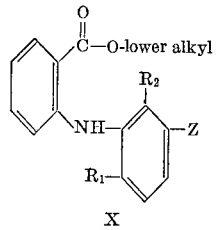

X are produced by reacting an N-arylanthranilic acid having the formula

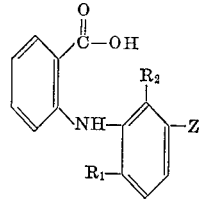

XI or a reactive derivative thereof with an esterifying agent; where R₁, R₂, and Z are as defined previously. Some examples of suitable reactive derivatives are the acid anhydride, acid halides, and alkali metal salts of the acid. Some examples of suitable esterifying agents are lower alkanols, such as methanol and ethanol; esters of lower alkanols, such as methyl bromide, methyl iodide, ethyl iodide, and dimethyl sulfate; and diazomethane.

When the esterifying agent is a lower alkanol, the process is preferably carried out by heating the free acid or the anhydride or halide in an excess of the lower alkanol. An acidic catalyst such as hydrogen chloride, sulfuric acid or benzenesulfonic acid is used when the free acid or the anhydride is one of the reactants. Additional solvents such as tetrahydrofuran, dioxane or diethylene glycol dimethyl ether may be present but are not necessary. The reaction is commonly carried out at a temperature in excess of 25° C., preferably at 60–150° C., but not higher than the reflux temperature, and is normally completed within 5 to 100 hours with the free acid or within 1 to 5 hours with the anhydride or a halide.

When the esterifying agent is an ester of a lower alkanol as described above, the process is preferably carried out by heating the anthranilic acid or salt thereof with the selected alkyl halide, dialkyl sulfate, or other alkyl ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are alkali metal hydroxides and carbonates, alkaline earth metal hydroxides, alkali metal alkoxides, and, in nonhydroxylic solvents, alkali metal hydrides. At least one equivalent and preferably an excess of the esterifying agent is used. The reaction is usually carried out at a temperature from 25 to 150° C., preferably from 50 to 100° C., and under these conditions it is substantially complete within 24 hours.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

The reactive derivatives of the N-aryl-anthranilic acids of Formula XI required as starting materials in the foregoing process are prepared in a number of ways. The acid halides are prepared by reacting the free N-arylanthranilic acids of Formula XI with a halogenating agent, such as thionyl chloride. The alkali metal salts are prepared by reacting the free acids with an alkali metal hydroxide. The acid anhydrides are prepared by reacting an alkali metal salt of the free acid with the acid chloride.

The di-lower alkyl-aminoalkyl N-arylanthranilate compounds of the invention, having the formula

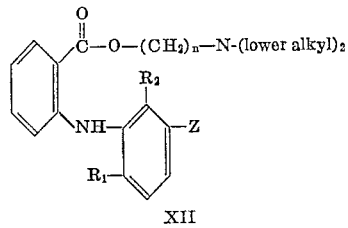

XII and acid-addition salts thereof are produced by esterifying an N-arylanthranilic acid having the formula

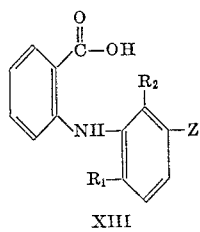

XIII or a reactive derivative thereof with an aminoalcohol of the formula

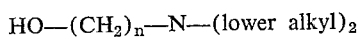

XIV or a reactive derivative thereof; where $n$ is 2, 3, or 4 and $R_1$, $R_2$, and Z are as defined before. This esterification can be carried out in a number of ways. One of the preferred methods involves reacting the N-arylanthranilic acid of Formula XIII with a di-lower alkylaminoalkyl halide of the formula

XV where X is a halogen atom, preferably chlorine or bromine, and $n$ is as defined above. The di-lower alkyl-aminoalkyl halide is preferably utilized in the form of the corresponding hydrohalide salt. For reasons of economy the reaction is usually carried out in the presence of one or more equivalents of a substance having a greater base strength than the di-lower alkyl-aminoalkyl halide. Some examples of suitable basic compounds are tertiary amines such as triethylamine, and N-ethylpiperidine and inorganic bases such as the alkali metal carbonates, alkali metal bicarbonates, alkaline earth metal carbonates, alkaline earth metal oxides and the like. The reaction is carried out under substantially anhydrous conditions and in an inert organic solvent such as ethanol, N,N-dimethylformamide, benzene, xylene, and the like. The relative quantities of the reactants are not particularly critical. Usually, the N-arylanthranilic acid and the di-lower alkyl-aminoalkyl halide are used in approximately equivalent quantities. When the free N-arylanthranilic acid and the free base of the di-lower alkyl-aminoalkyl halide are so used, approximately one equivalent of a basic compound is employed and the desired di-lower alkyl-aminoalkyl ester is obtained in the reaction mixture as the free base. Alternatively, when a hydrohalide salt of the di-lower alkyl-aminoalkyl halide is employed, approximately two equivalents of the basic compound are preferably used and the di-lower alkyl-aminoalkyl ester is again obtained as the free base. The temperature of the reaction is not critical and may be varied from about 50 to 125° C. The preferred reaction temperature is in the neighborhood of 100° C., that is, between about 85 and 110° C.

The esterification can also be carried out by reacting an acid halide, preferably an acid chloride, of the N-arylanthranilic acid of Formula XIII with an aminoalcohol of Formula XIV. The reaction can be carried out by dissolving the reactants in an inert organic solvent and allowing the reaction mixture to stand at ordinary temperature, that is, 20 to 25° C. Some of the organic solvents that can be used for the reaction are aromatic hydrocarbons, such as benzene, xylene, and toluene; aliphatic hydrocarbons, such as pentane and petroleum ether; and ethers, such as diethyl ether, dibutyl ether, and dioxane. The relative quantities of the two reactants are not critical but it is preferable to use approximately two equivalents of the aminoalcohol for each equivalent of the N-arylanthranilic acid chloride.

The di-lower alkyl-aminoalkyl N-arylanthranilate compounds of the invention form acid-addition salts with a variety of inorganic and organic acids. Some examples of pharmaceutically-acceptable acid-addition salts that can be prepared either as described above or by reaction with the corresponding acid are the hydrochloride, hydrobromide, sulfate, phosphate, hydriodide, acetate, propionate, citrate, tartrate, benzoate, sulfamate, and benzenesulfonate. The di-lower alkyl-aminoalkyl N-arylanthranilates also form pharmaceutically-acceptable quaternary ammonium salts by reaction of the free bases with an alkyl halide, such as methyl bromide, methyl iodide, and ethyl iodide.

The free N-arylanthranilic acids of Formula I form pharmaceutically-acceptable salts with a variety of inorganic and organic bases. Some typical examples of these salts are the sodium, potassium, calcium, ammonium, choline, 2-hydroxyethylammonium, bis(2-hydroxyethyl) ammonium, tris(2-hydroxyethyl)ammonium and like salts. Preferred salts are the pharmaceutically-acceptable salts of an alkali metal, an alkaline earth metal, ammonia or a substituted ammonia.

The N-arylanthranilic acids of Formula I, their pharmaceutically-acceptable salts, the lower alkyl esters thereof, the di-lower alkyl-aminoalkyl esters thereof, and the pharmaceutically-acceptable acid-addition salts and quaternary salts of the di-lower alkyl-aminoalkyl esters thereof possess a high degree of anti-inflammatory activity, and hence are of value in mitigating the symptoms associated with inflammatory conditions as well as in preventing or suppressing the occurrence of inflammation. The preferred compounds for use as anti-inflammatory agents are the free N-arylanthranilic acids of Formula I and their pharmaceutically-acceptable salts. The compounds of the invention also exhibit antipyretic activity, as well as anti-allergic activity. Their anti-allergic activity is demonstrated by their antagonism toward bradykinin. This effect is observed as a suppression of the bronchoconstriction produced by bradykinin in laboratory animals, especially in guinea pigs. The compounds of the invention are preferably administered by the oral route. The di-lower alkyl-aminoalkyl N-arylanthranilates are preferably administered in the form of one of their pharmaceutically-acceptable acid-addition salts.

The preferred compounds of the invention, because of their high degree of anti-inflammatory activity, are the N-arylanthranilic acids having the formula

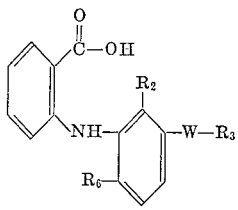

where W is carbonyl ($>C=O$) or hydroxymethylene ($>CH-OH$), $R_6$ is methyl or chlorine, and $R_2$ and $R_3$ are as defined previously.

The invention is illustrated by the following examples:

EXAMPLE 1

A mixture consisting of 47.8 g. of potassium o-bromobenzoate, 41.4 g. of 3-amino-2,4-dimethylacetophenone, ethylene ketal, 3.6 g. of cupric acetate, 2.5 ml. of N-ethylmorpholine and 80 ml. of isopropanol is stirred and heated under reflux for 19 hours. The reaction mixture is diluted with 200 ml. of 1 N sodium hydroxide and the basic mixture is washed with ether. The aqueous solution is stirred with diatomaceous earth (Super-Cel), filtered, and the filtrate is chilled and acidified by the dropwise addition of 40 ml. of cold 6 N hydrochloric acid and 10 ml. of 1 N hydrochloric acid. The supernatant liquid is separated, the residue is heated in 400 ml. of water, and the solid N-(3-acetyl-2,6-dimethylphenyl)anthranilic acid, ethylene ketal obtained is isolated and crystallized, first from ethanol, then from benzene; M.P. 191–194° C.

The sodium salt of N-(3-acetyl-2,6-dimethylphenyl)anthranilic acid, ethylene ketal is prepared by treating a solution of 1.0 g. of the free acid in ethanol with an equivalent amount of sodium hydroxide dissolved in ethanol, and evaporating the resulting mixture to dryness under reduced pressure.

By utilizing the foregoing procedure, the following N-arylanthranilic acids are obtained from the reaction of potassium o-bromobenzoate with the designated ketal compounds:

(a) From the reaction with 3-amino-2,4-dimethylacetophenone, 1,2-propylene ketal there is obtained N-(3-acetyl-2,6-dimethylphenyl)anthranilic acid, propylene ketal.

(b) From reaction with 3-amino-2,4-dimethyl-butyrophenone, ethylene ketal there is obtained N-(3-butyryl-2,6-dimethylphenyl)anthranilic acid, ethylene ketal.

The preparation of the ketal compounds used as starting materials in the foregoing procedure can be illustrated by the preparation of 3-amino-2,4-dimethylacetophenone, ethylene ketal according to the following procedure.

To a stirred mixture of 57.8 g. of acetyl chloride, 160 g. of aluminum chloride, and 160 g. of carbon disulfide is slowly added 60 g. of 2,6-dimethylacetanilide, and the resulting solution is heated under reflux until hydrogen chloride evolution ceases. The solvent is removed by distillation, the residue is poured onto a mixture of ice and hydrochloric acid, and the precipitated 3-acetamido-2,4-dimethylacetophenone is isolated, washed with water, and dried; M.P. 132–133° C., after crystallization from benzene. A mixture of 26.6 g. of 3-acetamido-2,4-dimethylacetophenone, 18.5 ml. of ethylene glycol, 0.5 g. of p-toluenesulfonic acid monohydrate, and 153 ml. of benzene is heated at reflux under a water separator until the calculated amount of water (1.57 ml.) is collected. The reduction mixture is poured onto a mixture of ether, ice, and 0.4 g. of sodium bicarbonate, and the precipitated 3-acetamido-2,4-dimethylacetophenone, ethylene ketal is isolated by filtration. The filtrate is concentrated to obtain additional solid product, and the combined product is washed with water, dried and crystallized from benzene-cyclohexane; M.P. 160–164° C. A mixture consisting of 21.8 g. of 3-acetamido-2,4-dimethylacetophenone, ethylene ketal, 272 ml. of ethylene glycol, 76.5 ml. of water, and 109 g. of 85% aqueous potassium hydroxide is heated under reflux for 22 hours. The cooled mixture is extracted with six 100-ml. portions of ether, and the combined ether extracts are washed, first with water, then with a saturated aqueous sodium chloride solution, and dried over anhydrous magnesium sulfate. The dried ether solution is evaporated to dryness under reduced pressure, to give the 3-amino-2,4-dimethylacetophenone, ethylene ketal, used without further purification.

EXAMPLE 2

A mixture consisting of 32.5 g. of potassium o-bromobenzoate, 20.6 g. of 3-amino-2,4-dimethylpivalophenone, 4.0 g. of anhydrous cupric acetate, 1.5 ml. of N-ethylmorpholine, and 100 ml. of N,N-dimethylacetamide is stirred and heated under nitrogen at 115–125° C. for 24 hours. The cooled reaction mixture is poured into 3000 ml. of water, and aqueous mixture is acidified with concentrated hydrochloric acid, and the precipitated solid is isolated and dissolved in 1 N aqueous sodium hydroxide. The alkaline solution is filtered, extracted 3 times with ether to remove unreacted starting material, and acidified with 6 N hydrochloric acid. The solid N-(2,6-dimethyl-3-pivaloylphenyl)anthranilic acid obtained is isolated, dried, and crystallized from aqueous ethanol; M.P. 169–170° C.

The 3-amino-2,4-dimethylpivalophenone used as a starting material in the foregoing procedure is prepared as follows. 2,4-dimethylpivalophenone is nitrated with a mixture of concentrated nitric acid and concentrated sulfuric acid to prepare 2,4-dimethyl-3,5-dinitropivalophenone, M.P. 85–86° C. A solution of 86 g. of 2,4-dimethyl-3,5-dinitropivalophenone in 400 ml. of ethanol and 600 ml. of ammonium hydroxide is saturated at room temperature with hydrogen sulfide gas. The resulting solution is heated on a steam bath under reflux for 30 minutes, cooled, saturated again with hydrogen sulfide, and then heated under reflux for 3 hours more. The solvent is evaporated under reduced pressure, the solid residue is boiled with 2 N hydrochloric acid, the acidic mixture is filtered, and the filtrate is made alkaline. The precipitated 5-amino-2,4-dimethyl-3-nitropivalophenone is isolated, dried, and crystallized from methanol; M.P. 141–142° C. A mixture consisting of 90.5 g. of 5-amino-2,4-dimethyl-3-nitropivalophenone, 170 ml. of concentrated hydrochloric acid, and 60 ml. of water is cooled to 0° C., and a cooled solution of 40 g. of sodium nitrite in 60 ml. of water is slowly added with stirring while maintaining the temperature at 0–5° C. The resulting mixture is stirred for two hours at 0° C., 600 ml. of cold hypophosphorous acid is added, and the mixture is stirred for 2 hours more at 0° C. and kept at 0–5° C. for 60 hours. The solid 2,4-dimethyl-3-nitropivalophenone obtained is isolated, dried, distilled at 120–122° C./0.5 mm. Hg., and crystallized from aqueous ethanol; M.P. 83–85° C. A solution of 30 g. of 2,4-dimethyl-3-nitropivalophenone in 300 ml. of glacial acetic acid is heated on a steam bath while 46 g. of iron filings is added in portions over a period of 75 minutes. The mixture is diluted with 100 ml. of water at the start of the addition and again after 45 minutes. The mixture is then heated for 2 hours more, cooled, poured into water, and the aqueous solution is extracted five times with ether. The ethereal extract is washed with water, with saturated aqueous sodium carbonate, with water again, and is then dried over anhydrous sodium sulfate. The dried solution is evaporated to dryness under reduced pressure and the residue of 3-amino-2,4-dimethylpivalophenone is distilled; B.P. 134° C./0.3 mm. Hg.

EXAMPLE 3

A mixture consisting of 13.7 g. of potassium o-bromobenzoate, 12.7 g. of 3-amino-2,4-dichlorobenzophenone, 1.7 g. of cupric acetate, 0.8 ml. of N-ethylmorpholine, and 15 ml. of N,N-dimethylacetamide is stirred and heated under nitrogen at 100–110° C. for 60 hours. The reaction mixture is diluted with 150 ml. of water, made alkaline with 2 N sodium hydroxide, shaken with ether and filtered. The aqueous filtrate is acidified with hydrochloric acid, diluted with water to a volume of 500 ml., and the precipitated N-(3-benzoyl-2,6-dichlorophenyl) anthranilic acid is isolated, washed with water and crystallized successively from aqueous ethanol and from benzene; M.P. 218–218.5° C.

The potassium salt of N-(3-benzoyl-2,6-dimethylphenyl) anthranilic acid is prepared by treating a solution of 1.0 g. of the free acid in ethanol with an equivalent amount of potassium hydroxide in ethanol, and evaporating the resulting mixture to dryness under reduced pressure.

By utilizing the foregoing procedure, the following N-arylanthranilic acids are obtained from the reaction of potassium o-bromobenzoate with the designated 3-aminobenzophenone compounds:

(a) From reaction with 3-amino-2,4-dimethylbenzophenone there is obtained N-(3-benzoyl-2,6-dimethylphenyl)anthranilic acid, M.P. 167–170° C., after crystallization from aqueous methanol.

(b) From reaction with 3-amino-2-methylbenzophenone there is obtained N-(3-benzoyl-2-methylphenyl) anthranilic acid.

N-(3-benzoyl-2,6-dimethylphenyl)anthranilic acid (2.0 g.) is suspended in 20 ml. of acetone and one equivalent of diethanolamine in 10 ml. of acetone is added with stirring. The mixture is diluted with 20 ml. of petroleum ether and kept at room temperature for several hours. The diethanolamine salt of N-(3-benzoyl-2,6-dimethylphenyl)anthranilic acid that crystallizes is collected and dried.

The preparation of the 3-aminobenzophenone compounds used as starting materials in the foregoing procedure can be illustrated by the preparation of 3-amino-2,4-dichlorobenzophenone according to the following procedure.

A mixture of 15.0 g. of 2,4-dichloro-3-nitrobenzoic acid and 50 ml. of thionyl chloride is heated under reflux for 2 hours. The excess thionyl chloride is removed by distillation under reduced pressure; benzene is added to allow the removal of the last traces. The residue of 2,4-dichloro-3-nitrobenzoyl chloride is dissolved in 40 ml. of benzene, and the solution is added at 25–35° C. during a period of 30 minutes to a suspension of 21.2 g. of powdered aluminum chloride in 25 ml. of carbon disulfide and 15 ml. of benzene. The resulting mixture is heated at 50° C. for 30 minutes, kept at room temperature for 16 hours, and is poured onto a mixture of ice and 6 N hydrochloric acid. The aqueous mixture is extracted with ether, and the ether extract is washed with water, dried, and evaporated to dryness under reduced pressure to give 2,4-dichloro-3-nitrobenzophenone, M.P. 85–86° C., after crystallization from n-hexane. To a solution of 62.0 g. of stannous chloride dihydrate in 68 ml. of concentrated hydrochloric acid and 100 ml. of ethanol kept at room temperature is added 18.6 g. of 2,4-dichloro-3-nitrobenzophenone. The reaction mixture is stirred at room temperature for 16 hours, the resulting solution is made alkaline with aqueous sodium hydroxide, and the alkaline mixture is extracted with ether. The ether extract is washed with water, dried, and evaporated to dryness under reduced pressure to give the desired 3-amino-2,4-dichlorobenzophenone; M.P. 102.5–103° C. after successive crystallizations from n-heptane and aqueous ethanol.

EXAMPLE 4

A mixture consisting of 9.9 g. of potassium o-bromobenzoate, 6.9 g. of 2,4,4'-trimethyl-3-aminobenzophenone, 0.44 ml. of N-ethylmorpholine, 1.18 g. of cupric acetate, and 11 ml. of N,N-dimethylacetamide is stirred and heated under nitrogen at 100–110° C. for 24 hours. The mixture is diluted with 500 ml. of water, and the aqueous mixture is acidified with concentrated hydrochloric acid. The precipitated solid is isolated, dissolved in 100 ml. of 1 N sodium hydroxide, and the alkaline solution is filtered. The filtrate is extracted with ether and acidified with 6 N hydrochloric acid. The N-[3-(p-toluoyl)-2,6-dimethylphenyl]anthranilic acid that precipitates is isolated and crystallized from aqueous methanol; M.P. 174–175° C.

The 2,4,4'-trimethyl-3-aminobenzophenone, M.P. 59–60° C., used as a starting material in the foregoing procedure, is prepared by reacting 2,4-dimethyl-3-nitrobenzoyl chloride with toluene in the presence of aluminum chloride and reducing the intermediate 2,4,4'-trimethyl-3-nitrobenzophenone, M.P. 77–78° C., according to the procedure described in Example 2 above for the preparation of 3-amino-2,4-dichlorobenzophenone.

EXAMPLE 5

A mixture consisting of 16.3 g. of potassium o-bromobenzoate, 10.0 g. of 3-amino-2,4-dimethylbenzonitrile, 1.0 g. of cupric bromide, 7.87 g. of N-ethylmorpholine, and 50 ml. of diethylene glycol dimethyl ether is stirred and heated under nitrogen at 140° C. for 4 hours. The reaction mixture is poured into water and acidified with concentrated hydrochloric acid. The solid N-(3-cyano-2,6-dimethylphenyl)anthranilic acid obtained is isolated, washed with water, dried, and crystallized from aqueous ethanol; M.P. 241–243° C.

The sodium salt of N-(3-cyano-2,6-dimethylphenyl) anthranilic acid can be prepared by dissolving the free acid in hot ethanol, treating the solution with an equivalent amount of sodium hydroxide in ethanol and evaporating the resulting mixture to dryness under reduced pressure.

A mixture of 1.4 g. of choline chloride and 2.9 g. of the sodium salt of N-(3-cyano-2,6-dimethylphenyl) anthranilic acid in ethanol is heated to about 70° C. for 10–15 minutes. The sodium chloride that forms in the course of the reaction is removed by filtration, and the filtrate is concentrated under reduced pressure to give the choline salt N-(3-cyano-2,6-dimethylphenyl)anthranilic acid.

By utilizing the above procedure, the following N-arylanthranilic acids are obtained from the reaction of potassium o-bromobenzoate with the designated 3-aminobenzonitrile compounds:

(a) From reaction with 3-amino-2-methylbenzonitrile there is obtained N-(3-cyano-2-methylphenyl)anthranilic acid; M.P. 234–235° C., after crystallization from ethanol.

(b) From reaction with 3-amino-2,4-dichlorobenzonitrile there is obtained N-(2,6-dichloro-3-cyanophenyl) anthranilic acid; M.P. 237.5–238° C., after successive crystallizations from aqueous ethanol and benzene n-heptane.

(c) From reaction with 3-amino-2-chlorobenzonitrile there is obtained N-(2-chloro-3-cyanophenyl)anthranilic acid.

(d) From reaction with 3-amino-2-chloro-4-methylbenzonitrile there is obtained N-(2-chloro-3-cyano-6-methylphenyl)anthranilic acid; M.P. 238–238.5° C., after successive crystallizations from aqueous ethanol and benzene-acetone.

The preparation of the 3-aminobenzonitrile compounds used as starting materials in the foregoing procedure can be illustrated by the preparation of 3-amino-2,4-dichlorobenzonitrile according to the following procedure. Over a period of 5–10 minutes, 8.7 g. of phosphorous oxychloride is added dropwise to a solution of 12.5 g. of 2,6-dichloro-3-nitrobenzamide in 30 ml. of pyridine maintained at 15–25° C. The mixture is kept at room temperature for 1 hour, and is then slowly poured into an ice-water mixture. The precipitated 2,4-dichloro-3-nitrobenzonitrile is collected, washed with water, and dried; M.P. 125–126° C., after crystallization from aqueous methanol. To a solution of 46.0 g. of stannous chloride dihydrate in 51 ml. of concentrated acid and 75 ml. of ethanol is added, in portions, at 20–25° C., 10.4 g. of 2,4-dichloro-3-nitrobenzonitrile. The mixture is stirred at room temperature for 16 hours, and cooled to 0° C. The precipitated solid is isolated by filtration, and the filtrate is diluted with water to yield additional solid. The combined solids are stirred with dilute aqueous sodium hydroxide in the presence of ether, and the ethereal solution obtained is separated, washed with water, dried, and evaporated to dryness under reduced pressure to give the desired 3-amino-2,4-dicholorobenzonitrile; M.P. 117.5–118° C., after crystallization from n-heptane.

The N-(3-cyano-2,6-dimethylphenyl)anthranilic acid product of this example can also be prepared by reaction of a mixture consisting of 8.5 g. of potassium anthranilate, 10.0 g. of 3-bromo-2,4-dimethylbenzonitrile, 1.0 g. of cupric acetate, 0.7 g. of N-ethylmorpholine, and 50 ml. of dry, N,N-dimethylacetamide according to the procedure described above. The 3-bromo-2,4-dimethylbenzonitrile required as a starting material can be prepared from 2,4-dimethyl-3-nitrobenzonitrile by catalytic reduction followed by diazotization, in 48% hydrobromic acid, of the intermediate 3-amino-2,4-dimethylbenzonitrile, and decomposition of the diazonium salt in the presence of cuprous bromide. The operating details for the diazotization and reaction with cuprous bromide are identical to those reported in Organic Syntheses, Coll. vol. III, John Wiley & Sons, Inc., 1955, p. 185, for the preparation of o-chlorobromobenzene from o-chloroaniline.

EXAMPLE 6

A mixture consisting of 16.3 g. of potassium o-bromobenzoate, 10.85 g. of 3-amino-N,N-2,4-tetramethylbenzamide, 2.0 g. of cupric acetate, 2.0 ml. of N-ethylmorpholine, and 35 ml. of N,N-dimethylacetamide is stirred at 100° C. for 24 hours. The cooled mixture is poured into an excess of 4 N hydrochloric acid, and the precipitated solid is collected, washed with water, dried, dissolved in a 20% solution of ethanol in petroleum ether (B.P. 60–80° C.), and the solution is chromatographed on a silica column. The column is eluted with benzene, the benzene solution is evaporated under reduced pressure, and the solid obtained is dissolved in 0.5 N sodium hydroxide. The alkaline solution is extracted with ether and acidified with hydrochloric acid to give N-(2,6-dimethyl-3-dimethylcarbamoylphenyl)-anthranilic acid; M.P. 195° C., after crystallization from aqueous ethanol.

By utilizing the foregoing procedure, the following N-arylanthranilic acids are obtained from the reaction of potassium o-bromobenzoate with the designated 3-aminobenzamide compounds:

(a) From reaction with 3-amino-2,4-dimethyl-N,N-diethylbenzamide there is obtained N-(3-diethylcarbamoyl-2,6-dimethylphenyl)anthranilic acid.

(b) From reaction with 3-amino-2,4-dichloro-N,N-dimethylbenzamide there is obtained N-(2,6-dichloro-3-dimethylcarbamoylphenyl)anthranilic acid, M.P. 197–198° C.

The preparation of the 3-aminobenzamide compounds used as starting materials in the foregoing procedure can be illustrated by the preparation of 3-amino-N,N,2,4-tetramethylbenzamide according to the following procedure.

A mixture of 19.5 g. of 2,4 - dimethyl - 3 - nitrobenzoic acid and 30 g. of thionyl chloride is heated under reflux for 30 minutes. The excess thionyl chloride is evaporated under reduced pressure and the solid residue of 2,4-dimethyl-3-nitrobenzoyl chloride is dissolved in 100 ml. of benzene. The benzene solution is added dropwise, with stirring, to a solution of 20 g. of dimethylamine in 500 ml. of benzene kept at 5–10° C., the resulting solution is kept at room temperature for 16 hours, and is then evaporated to dryness. The residue is stirred with aqueous sodium bicarbonate, isolated, washed with water, dried and distilled under reduced pressure to give N,N,2,4-tetramethyl-3-nitrobenzamide, B.P. 154° C./1.7 mm. Hg; M.P. 57° C. A mixture of 14.45 g. of N,N,2,4-tetramethyl-3-nitrobenzamide, 0.3 g. of 10% palladium on charcoal, and 200 ml. of ethanol is shaken at room temperature with hydrogen at 3 atmospheres pressure until hydrogen uptake ceases. The catalyst is removed by filtration, the solvent is evaporated from the filtrate under reduced pressure, and the residue is distilled under reduced pressure to give the desired 3-amino-N,N,2,4-tetramethylbenzamide, B.P. 168–176° C./7.5 mm. Hg; M.P. 91° C.

EXAMPLE 7

A mixture consisting of 5.0 g. of N-(3-acetyl-2,6-dimethylphenyl)anthranilic acid, 5.0 g. of hydroxylamine hydrochloride, 12.5 ml. of pyridine, and 12.5 ml. of ethanol is heated under reflux for 21 hours. The cooled reaction mixture is acidified with 6 N hydrochloric acid and diluted with an equal volume of water. The precipitated N-(3-acetyl-2,6-dimethylphenyl)anthranilic acid oxime is isolated, washed with hot water, dried, and crystallized from aqueous ethanol; M.P. 234–235° C.

In the foregoing procedure, with the substitution of 5.0 g. of N-(3-butyryl-2,6-dimethylphenyl)anthranilic acid for the N-(3-acetyl-2,6-dimethylphenyl)anthranilic acid there is obtained N-(3-butyryl-2,6-dimethylphenyl)anthranilic acid oxime.

EXAMPLE 8

A solution of 35.4 g. of N-(3-acetyl-2,6-dimethylphenyl)anthranilic acid, ethylene ketal in 200 ml. of hot acetone is diluted with 65 ml. of hot water and 5 ml. of concentrated hydrochloric acid. The resulting solution is heated under reflux until a solid begins to separate, the mixture is chilled, and the precipitated N-(3-acetyl-2,6-dimethylphenyl)anthranilic acid is isolated, washed with 50% aqueous acetone, and dried; M.P. 218–219.5° C.

In the foregoing procedure, with the substitution of 38 g. of N-(3-butyryl-2,6-dimethylphenyl)anthranilic acid, ethylene ketal for the N-(3-acetyl-2,6-dimethylphenyl)anthranilic acid, ethylene ketal there is obtained N-(3-butyryl-2,6-dimethylphenyl)anthranilic acid, M.P. 131–133.5° C., after several crystallizations from aqueous ethanol.

EXAMPLE 9

A mixture consisting of 23 g. of N-(3-acetyl-2,6-dimethylphenyl)anthranilic acid, 3 g. of Raney nickel, 3.25 g. of sodium hydroxide and 250 ml. of water is shaken at room temperature with hydrogen under 3 atmospheres pressure until 2 molecular equivalents of hydrogen are taken up. The catalyst is removed by filtration, the filtrate is added to a slight excess of 0.3 N hydrochloric acid, and the precipitated N-[3-(α-hydroxyethyl)-2,6-dimethylphenyl]anthranilic acid is isolated, washed with water, dried, and crystallized successively from benzene and from aqueous ethanol; M.P. 166–173° C.

The ammonium salt of N-[3-(α-hydroxyethyl)-2,6-dimethylphenyl]anthranilic acid is prepared by dissolving the free acid in hot ethanol, treating the solution with an excess of ammoniacal ethanol, and evaporating the mixture to dryness under reduced pressure.

By utilizing the foregoing procedure, the following N-arylanthranilic acids are obtained from the catalytic reduction of the designated N-arylanthranilic acids:

(a) From reduction of N-(3-butyryl-2,6-dimethylphenyl)anthranilic acid there is obtained N-[3-(α-hydroxybutyl)-2,6-dimethylphenyl]anthranilic acid.

(b) From reduction of N-(2,6-dimethyl-3-pivaloylphenyl)anthranilic acid there is obtained N-[2,6-dimethyl-3-(1-hydroxy - 2,2 - dimethylpropyl)]anthranilic acid, M.P. 205–206° C.

EXAMPLE 10

A solution of 7.6 g. of N-(3-acetyl-2,6-dimethylphenyl)anthranilic acid in 14.8 ml. of 2 N aqueous sodium hydroxide is cooled to 0° C., and a cold solution of 1.5 g. of sodium borohydride in 13 ml. of water is slowly added. The mixture is then stirred at room temperature for 2 hours, acidified with dilute hydrochloric acid, heated briefly, and the precipitated N-[3-(α-hydroxyethyl)-2,6-dimethylphenyl]anthranilic acid is isolated, washed with water, and dried.

EXAMPLE 11

A mixture consisting of 3.0 g. of N-(3-benzoyl-2,6-dimethylphenyl)anthranilic acid, 3.0 g. of powdered zinc, 6.0 g. of sodium hydroxide, and 100 ml. of 96% ethanol is heated under reflux for 5 hours. The reaction mixture is filtered, the filtrate is acidified with 6 N hydrochloric acid, and the precipitated N-[3-(α-hydroxybenzyl)-2,6-dimethylphenyl]anthranilic acid is isolated, washed with water, and dried; M.P. 144–145° C., after crystallization from benzene-petroleum ether.

EXAMPLE 12

To a solution of 4.0 g. of N-(3-acetyl-2,6-dimethylphenyl)anthranilic acid in 30 ml. of N,N-dimethylformamide is added, with stirring, 768 mg. of a 50% sodium hydride dispersion in mineral oil. After hydrogen evolution subsides, 11.9 g. of methyl iodide is added, and the mixture is heated at 50° C. for 2 hours. The cooled mixture is diluted with 100 ml. of water, and the aqueous mixture is extracted with ether. The ether extract is washed, first with cold aqueous sodium carbonate, then with water, and dried over anhydrous magnesium sulfate. The dried solution is then evaporated to dryness to give methyl N-(3-acetyl-2,6-dimethylphenyl)anthranilate.

By utilizing the foregoing procedure, the following N-arylanthranilate compounds are prepared from reaction of the designated N-arylanthranilic acids with the designated esterifying agents:

(a) From the reaction of N-(3-acetyl-2,6-dimethylphenyl)anthranilic acid, ethylene ketal with ethyl iodide there is obtained ethyl N-(3-acetyl-2,6-dimethylphenyl)anthranilate, ethylene ketal.

(b) From the reaction of N-(3-acetyl-2,6-dimethylphenyl)anthranilic acid oxime with methyl iodide there is obtained methyl N-(3-acetyl-2,6-dimethylphenyl)anthranilate oxime.

EXAMPLE 13

A mixture consisting of 14.4 g. of 2-dimethylaminoethyl chloride hydrochloride, 28.5 g. of N-[3-(α-hydroxyethyl)-2,6-dimethylphenyl]anthranilic acid, 20.2 g. of triethylamine and 125 ml. of N,N-dimethylformamide is heated at 90–100° C. for 24 hours. The cooled mixture is diluted with 250 ml. of ether, the precipitated solid is removed by filtration, and the filtrate is extracted with an excess of dilute hydrochloric acid. The acid aqueous extract is made alkaline by the addition of solid sodium carbonate, and the alkaline mixture is extracted with ether. After drying over anhydrous sodium sulfate, the ether extract is treated with an excess of hydrogen chloride. The solid 2-dimethylaminoethyl N-[3-(α-hydroxyethyl)-2,6-dimethylphenyl]anthranilate hydrochloride obtained is isolated and crystallized from ethanol.

The free base, 2-dimethylaminoethyl N-[3-(α-hydroxyethyl)-2,6-dimethylphenyl]anthranilate, can be obtained by stirring the hydrochloride salt with excess 5% aqueous sodium hydroxide in the presence of ether, separating the ether solution, and washing with water, drying, and evaporating the ether solution to dryness.

In the foregoing procedure, by the substitution of 18.6 g. of 3-diethylaminopropyl chloride hydrochloride for the 2-dimethylaminoethyl chloride hydrochloride and 26.6 g. of N - (3-cyano-2,6-dimethylphenyl)anthranilic acid for the N - [3-(α-hydroxyethyl)2,6-dimethylphenyl]anthranilic acid, there is obtained 3-diethylaminopropyl N - (3-cyano-2,6-dimethylphenyl)anthranilate hydrochloride.

In the foregoing procedure, by the substitution of 17.2 g. of 2-diethylaminoethyl chloride hydrochloride for the 2-dimethylaminoethyl chloride hydrochloride and 31.2 g. of N - (2,6-dimethyl-3-dimethylcarbamoylphenyl)-anthranilic acid for the N - [3-(α-hydroxyethyl)-2,-dimethylphenl]anthranilic acid, there is obtained 2-diethylaminoethyl N - (2,6-dimethyl-3-dimethylcarbamoylphenyl)anthranilate hydrochloride.

A suspension of 3.9 g. of 2-dimethylaminoethyl N-[3-(α - hydroxy) - 2,6-dimethylphenyl]anthranilate hydrochloride in 250 ml. of acetone is heated almost to boiling and then treated with 2 g. of 50% aqueous sodium hydroxide solution. The mixture is filtered and to the filtrate is added a solution of 2.5 g. of methyl iodide in 25 ml. of acetone and the resulting mixture is allowed to stand at room temperature for 3 days. To the mixture is added 100 ml. of petroleum ether and the 2-dimethylaminoethyl N - [3 - (α-hydroxyethyl)-2,6-dimethylphenyl)anthranilate methiodide that precipitates is isolated and crystallized from ethanol-petroleum ether.

I claim:

1. A member of the class consisting of N-aryl-anthranilic acids, which in their free acid form have the formula,

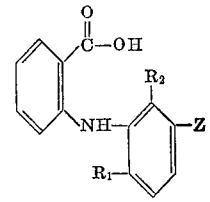

pharmaceutically-acceptable salts thereof, lower alkyl esters thereof, di-lower alkyl-aminoalkyl esters thereof, and pharmaceutically-acceptable acid-addition salts and quaternary salts of the di-lower alkyl-aminoalkyl esters thereof; where $R_1$ is a member of the class consisting of hydrogen, methyl, and chlorine; $R_2$ is a member of the class consisting of methyl and chlorine; and Z is a member of the class consisting of hydroxyalkyl, having the formula,

substituted carbonyl, having the formula,

ketoxime, having the formula,

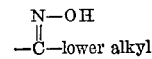

cyclic ketal, having the formula,

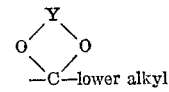

tertiary amide, having the formula

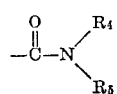

and cyano; where $R_3$ is a member of the class consisting of lower alkyl, phenyl, and lower alkyl-substituted phenyl; $R_4$ is a member of the class consisting of methyl and ethyl; $R_5$ is a member of the class consisting of methyl and ethyl; and Y is a lower alkylene radical separating the oxygen atoms to which it is attached by 2 carbon atoms.

2. N-(3-acetyl-2,6-dimethylphenyl)anthranilic acid.

3. N - (3-acetyl-2,6-dimethylphenyl)anthranilic acid, ethylene ketal.

4. N - (3 - acetyl-2,6-dimethylphenyl)anthranilic acid oxime.

5. N - [3 - ($\alpha$ - hydroxyethyl)-2,6-dimethylphenyl]-anthranilic acid.

6. N-(3-cyano-2,6-dimethylphenyl)anthranilic acid.

References Cited

UNITED STATES PATENTS 3,107,263  10/1963  Scherrer _____ 260—518

OTHER REFERENCES

Lucas: Organic Chemistry, 2nd Edition, 1953, American Book Co., New York, N.Y., pp. 110, 111, 223–226, 256, 262–4, 270 and 271.

Noller; Chemistry of Organic Compounds, 2nd Edition, 1951, W. B. Saunders Co., Philadelphia, pp. 198–199.

NICHOLAS S. RIZZO, *Primary Examiner.*

J. H. TURNIPSEED, *Assistant Examiner.*